United States Patent

[11] 3,591,287

| [72] | Inventor | Rodney George Hannis Reading, England |
|---|---|---|
| [21] | Appl. No. | 831,469 |
| [22] | Filed | June 9, 1969 |
| [45] | Patented | July 6, 1971 |
| [73] | Assignee | United Kingdom Atomic Energy Authority London, England |
| [32] | Priority | June 20, 1968 |
| [33] | | Great Britain |
| [31] | | 29578/68 |

[54] ABSORPTION SPECTROPHOTOMETRY
9 Claims, 15 Drawing Figs.
[52] U.S. Cl. .................................................. 356/51,
250/226, 356/74, 356/244
[51] Int. Cl. ...................................................... G01n 21/34,
G01j 3/00, G01n 21/16
[50] Field of Search ........................................... 356/74, 51,
244, 246, 250/226

[56] References Cited
UNITED STATES PATENTS
3,393,603  7/1968  Harrick ........................ 356/74
3,394,253  7/1968  Harrick et al. ................ 356/74

*Primary Examiner*—Ronald L. Wibert
*Assistant Examiner*—V. P. McGraw
*Attorney*—Larson, Taylor and Hinds ABSTRACT: Optical apparatus for use with an infrared spectrophotometer for attenuated total reflectance measurements of solid samples and, in particular, microgramme size samples includes an optical prism, bounded by plane and/or curved lateral faces, for internally reflecting a focused beam of infrared radiation incident substantially normal to a lateral face of the prism, the lateral faces of the prism being relatively disposed such that the beam is reflected by successive total internal reflections and describes a plurality of noncoincident cyclic tracks within the prism before being incident at a lateral face at an angle less than the critical angle and emerging from the prism, sample for absorptiometric analysis being applied to at least one reflecting face. The effective path length of the penetrant beam in the sample is substantially increased by generating the cyclic tracks whence the number of reflections per unit reflective face area is multiplied.

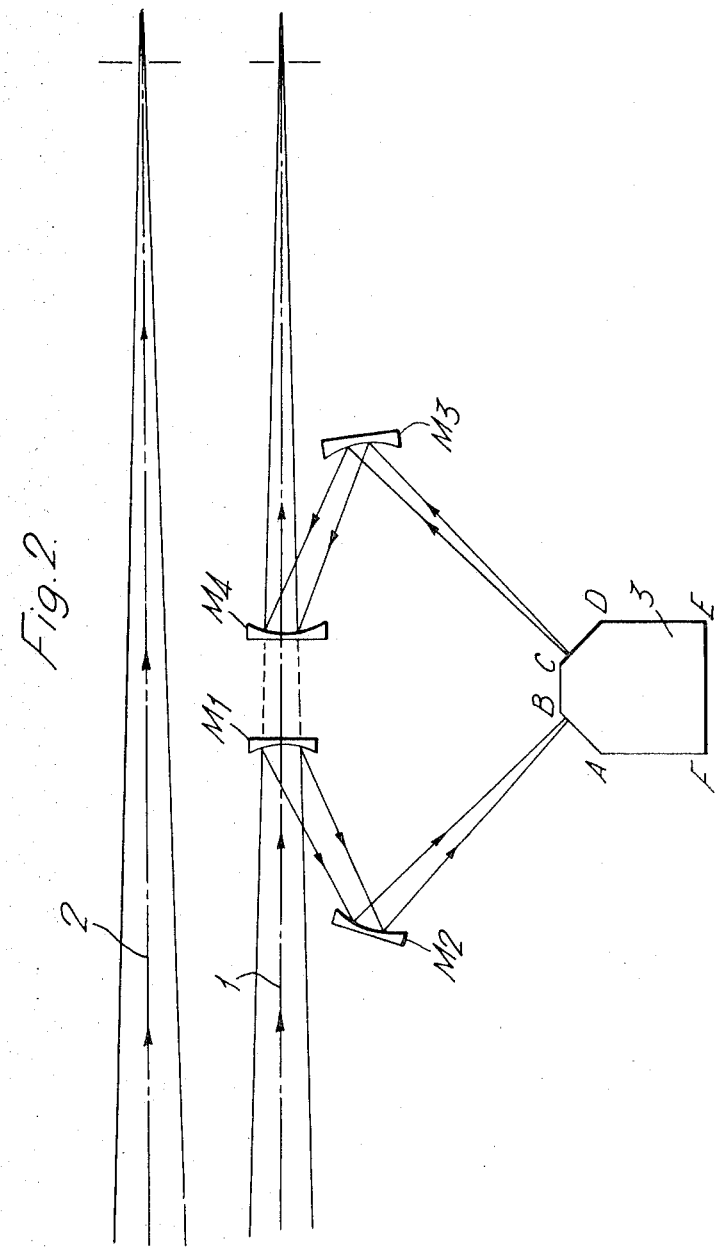

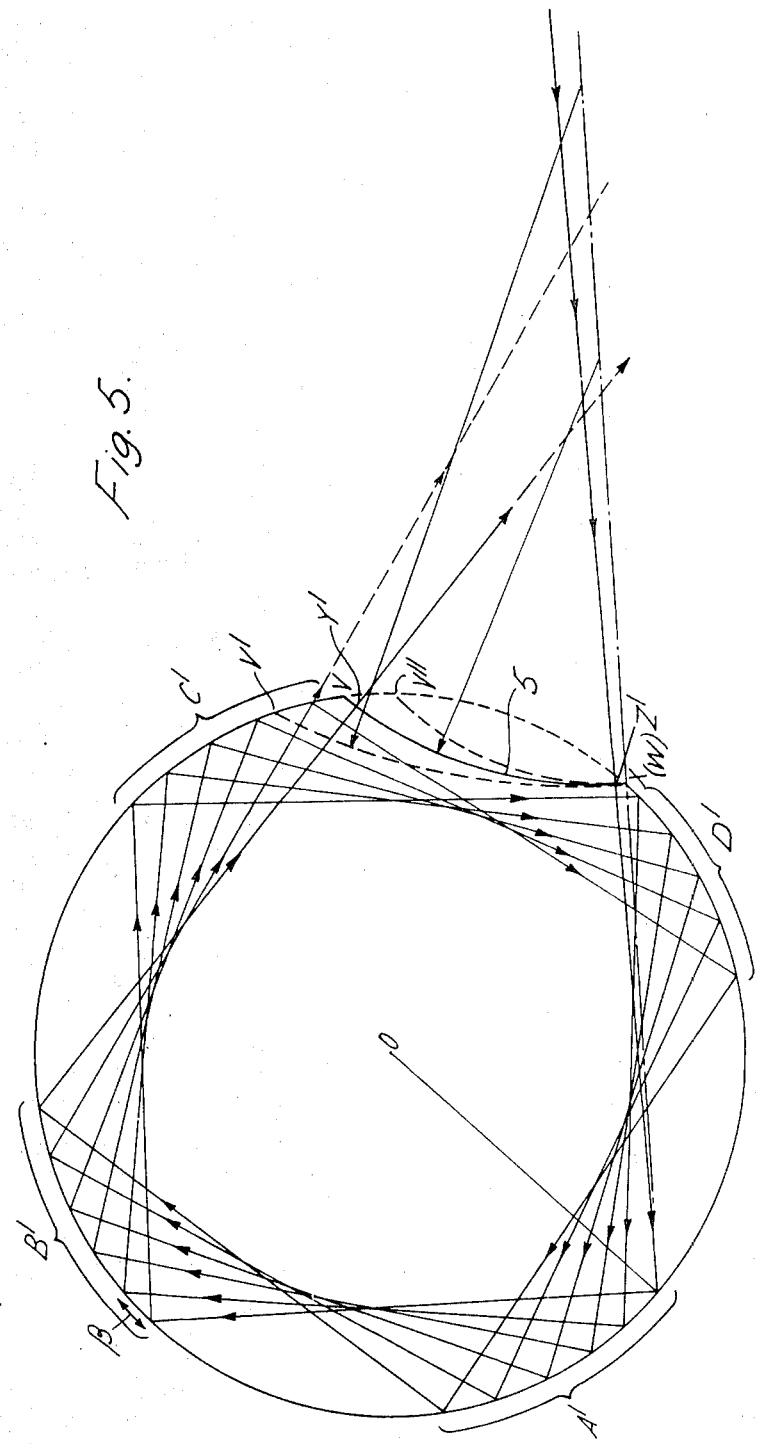

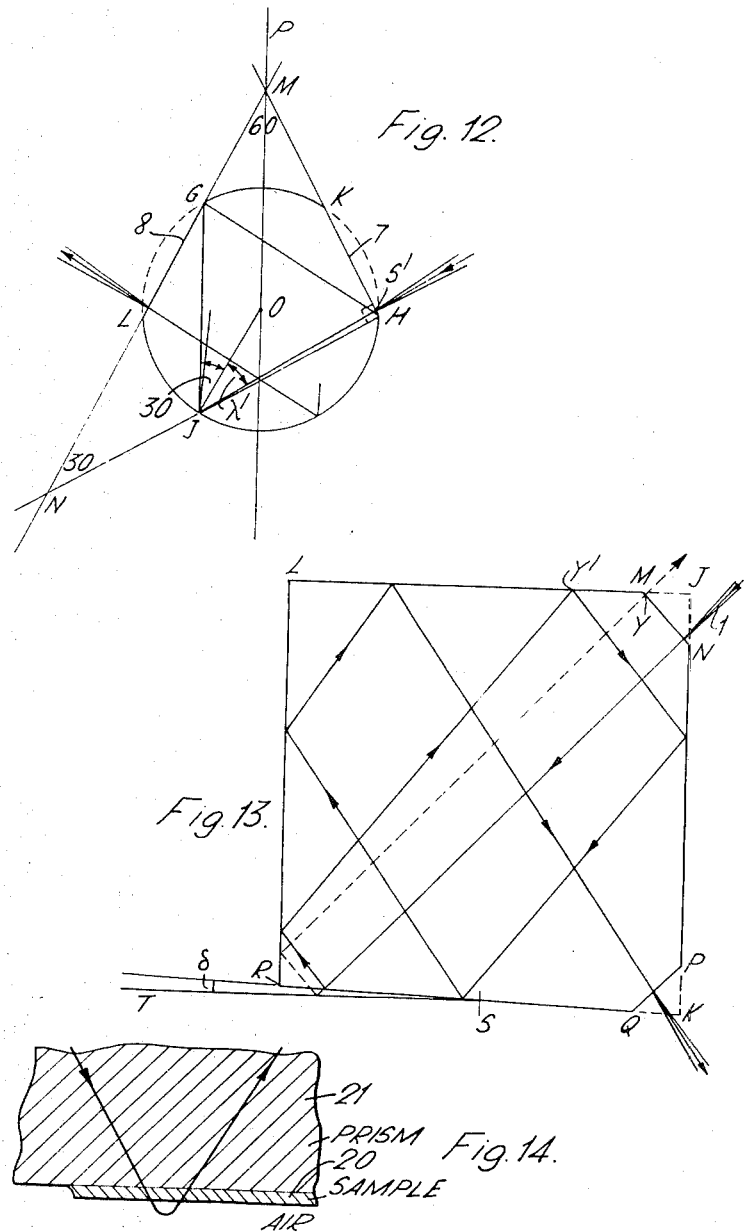

ABSORPTION SPECTROPHOTOMETRY

BACKGROUND OF THE INVENTION

This invention relates to infrared absorption spectrophotometry and, in particular, to apparatus whereby an infrared spectrophotometer can be used for attenuated total reflectance measurements.

In infrared spectrophotometry a beam of infrared radiation of wavelength normally extending from ~2 to ~15 microns is passed through a sample the absorption spectrum of which is required and, after passage therethrough, with selective absorption, the beam is passed through a refracting prism and the intensity at each wavelength measured by a detector, which usually measures the attenuation of the beam relative to a reference beam. Absorption spectra may be obtained by transmission or reflection spectroscopy.

When the sample is a solid e.g., an organic compound, the transmission spectrum can be measured by dissolving the solid in an inert solvent, or by making a mix of the solid with a material transparent to infrared radiation, e.g. liquid paraffin, to reduce scatter; an incident beam of infrared radiation passing through the solution or mix contained in a suitable cell.

An established technique for the measurement of the internal reflection spectrum of a solid by attenuated total reflectance spectroscopy is effected by mounting a film of the solid on one or more reflecting faces of an internally reflecting crystal and directing an infrared beam through the crystal the incident beam being totally internally reflected at the reflective face(s) of the crystal. Single and multiple reflection crystals can be in the form of solid hemicylinders and polygonal prisms respectively. The reflecting face of hemicylinders is the diametric plane where single reflections occur. Suitable polygonal prisms have a pair of parallel lateral faces constituting the reflective faces, films of the solid being mounted on these faces; one such multiple reflection prism being a trapezoidal prism, the incident beam entering and leaving the prism normal to the nonparallel faces and being totally internally reflected alternately by each of the parallel lateral faces.

Single reflection prisms yield unsatisfactory distorted spectra with thick films, and with thin films i.e. thinner than the depth of penetration, much improved but low intensity spectra are obtained. Complete absorption cannot be obtained with a single reflection whatever the value of the absorption coefficient, as the actual absorption depends upon the length of the radiation path through the sample and the path length is very short for a single reflection: hence the absorption spectrum from a single reflection from a small sample (thin film) is of low intensity, much of the infrared radiation reaching the detector unaltered. The absorption intensity is a function of the absorption coefficient of the sample, the interfacial sample/prism contact area and contact efficiency, the depth of infrared penetration and the number of reflections. Hence the absorption intensity is dependent upon the effective path length through the solid and multiple reflection prisms significantly increase the intensity of absorption spectra by increasing the number of reflections, thereby enabling more sensitive measurement of attenuation by the detector.

Milligram or larger size samples can be examined by transmission spectroscopy (as aforementioned) and can form films extending over the parallel lateral faces of multiple reflection prisms: most organic compounds, for example, can be dissolved in methanol and coated onto the faces, the methanol vaporizing to leave a thin adherent film of solid (the area of the parallel lateral faces of a typical multireflection prism is 100×15 mm²). For small samples of microgram size transmission spectroscopy requires extremely exacting techniques and there is insufficient solid to form an extensive thin film in reflection spectroscopy: in the limit there is only sufficient sample to cover such a small area on a single face that only a single reflection occurs at the sample mounted on a multiple reflection prism.

It is an object of the present invention to provide a prism for use in reflection spectroscopy whereby the effective path length of a penetrant infrared beam in a solid sample is substantially increased.

SUMMARY OF THE INVENTION

According to the present invention optical apparatus for use with an infrared spectrophotometer for attenuated total reflectance measurements comprises a prism for internally reflecting a focused beam of infrared radiation incident substantially normal to a lateral face thereof, the lateral faces of said prism being relatively disposed such that the beam is reflected by successive total internal reflections and describes a plurality of noncoincident cyclic tracks within the prism before being incident at a lateral face at an angle less than the critical angle and emerging from the prism, means for focusing a beam of the infrared radiation substantially normal to the first-mentioned lateral face and for locating said beam at a position on said face to generate said cyclic tracks and means for focusing the emergent beam at an entrance slit of said spectrophotometer.

The term "prism" in the present invention means a solid geometrical optical body bounded by plane and/or curved lateral faces.

The prism may have the shape of a cylinder having a segment removed therefrom to form a lateral concave face, the beam being focusable to be incident on said face and to emerge therefrom after multiple-reflection.

Preferably the prism has the shape of a cylinder having a further segment removed therefrom to form a further lateral concave face, the first-mentioned and further concave faces being substantially diametrically opposite, the beam being focusable to be incident on the first-mentioned face and to emerge through the further face.

In another construction the prism may be a hexagonal prism the lateral faces of the prism being relatively disposed such that the internally reflecting angles formed are 45°. The hexagonal prism may have one pair of parallel faces coplanar with one pair of sides of a notional square and another pair of parallel faces spaced closer together than are the other pair of sides of the notional square, and two further faces each disposed at substantially 45° to each of said other pair of faces, said focusing means being arranged respectively to focus a beam onto, and emerging from, each of said two further faces. Alternatively the lateral faces of a hexagonal prism may be relatively disposed to form internally reflecting angles of 30° and 60°. For this alternative construction the hexagonal prism may have one pair of parallel faces coplanar with the shorter pair of sides of a notional rectangle whose adjacent sides have length substantially in the ratio sin 30:sin 60, and another pair of parallel faces spaced closer together than are the longer pair of sides of the notional rectangle, and two further faces each disposed at substantially 60° to a common face of said other pair of faces and at substantially 30° to each of said one pair of faces, said focusing means being arranged respectively to focus a beam onto, and emerging from, each of said two further faces.

In a further construction the prism may have the shape of a cylinder having a first and second segment removed therefrom to form first and second lateral plane faces, the beam being focusable to be incident on the first face and to emerge through the second face, the first and second faces being relatively disposed to form internally reflecting angles of <30°. If desired, to increase the reflectance area, the first face may be concave.

The selection of prism materials for attenuated total reflectance (ATR) measurements of solids e.g. organic compounds dictates the range of incident angles which can be used: the incident angle must always be greater than that required for critical reflection but not so great as to produce a spectrum of low intensity (see below). To examine samples having refractive indices extending over a wide range and to produce spectra of maximum intensity prisms having internally reflecting angles approximating to 30°, 45° and 60° and in several optical materials e.g. Ge, KRS-5, KRS-6 are required.

The incident beam should preferably be normal to the incident face of an ATR prism hereby obviating refractive effects and dispersion of the focused beam: in practice a deviation from normal of a few degrees can be tolerated (<5°), negligible dispersion resulting for deviations of 2°—3°.

DESCRIPTION OF THE DRAWINGS

The nature of the present invention is further explained by reference to the accompanying drawings wherein.

FIG. 2 is an optical schematic diagram including an ATR system having a polygonal prism with totally internally reflecting angles of 45°.

FIG. 5 is an optical diagram showing the cyclic tracks produced by reflection of a beam of infrared radiation incident at a cylinder having a concave face for a totally internally reflecting angle of <45°.

FIG. 12 is a diagram illustrating the construction of the cylinder depicted in FIG. 11.

FIG. 13 is an optical diagram showing the cyclic tracks produced by reflection of a beam of infrared radiation incident at a polygonal prism having an inclined reflecting face.

DESCRIPTION OF THE PREFERRED EMBODIMENTS

FIG. 14 is an optical illustration of a total internal reflection at a microfilm adhering to a reflective face.

DESCRIPTION OF THE PREFERRED EMBODIMENTS

Figure 1:
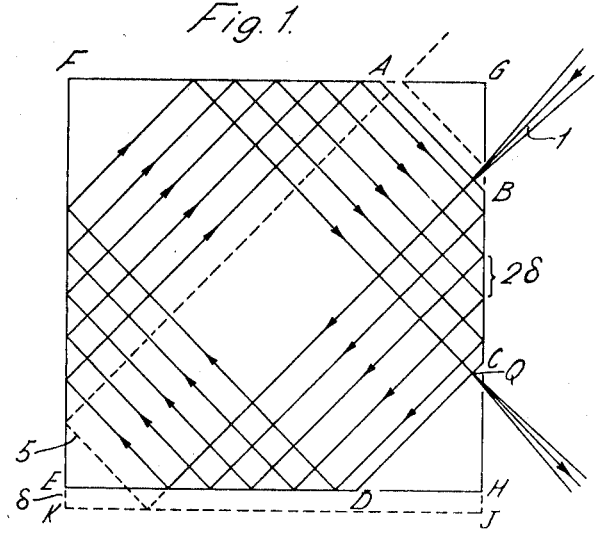
FIG. 1 is an optical diagram showing the cyclic tracks produced by reflection of a beam of infrared radiation incident at a polygonal prism having totally internally reflecting angles of 45°.

FIG. 1 shows the internal cyclic tracks produced by a beam 1 incident at a hexagonal prism ABCDEF derived from a rectangle FGHE the dimension of one side of the rectangle (GH, FE) being less (by a decrement $\delta$) than that of an adjacent side (FIG. EH) the edges of lateral faces AB, CD of the hexagonal prism being the base lines of isosceles triangles GAB and HCD. The beam 1 is brought to a focus at the face AB the axis of the beam being normal to the face. The beam is totally internally reflected at the perimeter ABCDEF, successive reflections occurring at the reflecting faces DE, EF, FA and BC with successive cyclic tracks initiating at face BC, the incident angle at each reflecting face being 45°. The differential $\delta$ (EK, HJ) results in a displacement of 2$\delta$ separating adjacent reflections or any of the reflecting faces. For total internal reflection to occur it is essential for the beam 1 to be incident at face AB at a distance less than $\sqrt{2}\delta$ from B, otherwise the beam is reflected at faces ED and EF to emerge from the prism normal to AB. The cyclically reflected beam is progressively displaced by increments 2$\delta$ down the face BC until it strikes the face DC at Q. The beam is normal to the face DC and emerges therefrom without refraction.

The number of cyclic tracks is determined by the length of the side BC and the value of $\delta$: the smaller the value of $\delta$ the greater the number of reflections. For ATR measurements of microsize samples $\delta$ should be small.

In the drawing, substantially to scale, the rectangle FGHE can have, for example, adjacent sides measuring 10 mms. and 9.5 mms. i.e. $\delta$ has a value of 0.5 mms.

FIG. 2 shows the sample and reference beams 1 and 2 originating from an infrared source located in a spectrophotometer. Attenuated total reflectance apparatus consisting of reflecting mirrors $M_1$ and $M_2$, hexagonal prism 3 and reflecting mirrors $M_3$ and $M_4$ intercepts the sample beam; mirrors $M_1$ and $M_2$ focus the beam at face AB of the prism 3, the emergent beam leaving face CD being focused by mirrors $M_3$ and $M_4$ to coincide with the converging path of the nonintercepted beam.

Figure 3:
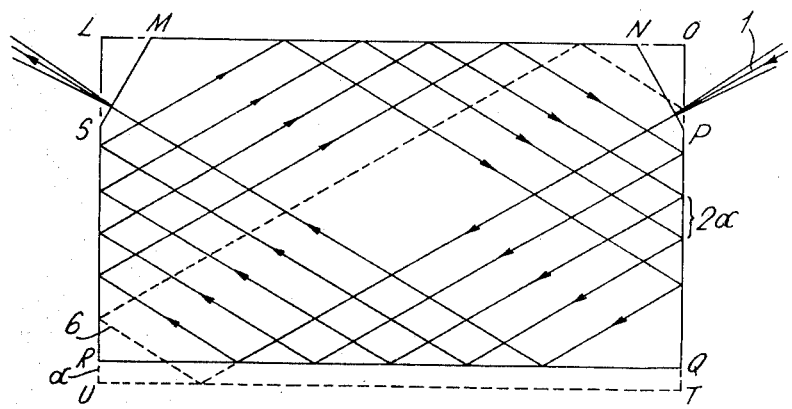
FIG. 3 is an optical diagram showing the cyclic tracks produced by reflection of a beam of infrared radiation incident at a polygonal prism having totally internally reflecting angles of 30° and 60°.

FIG. 3 shows the internal cyclic tracks produced by a beam 1 incident at a hexagonal prism NMPQRS derived from a rectangle LOQR. The angles OPN and LSM are each 30° whereby the beam 1 is normal to the face PN and the emergent beam is normal to the face SM. Triangles OPN and LSM are congruent. The beam 1 is incident at angles of 30° to prism faces PQ and RS and at angles of 60° to faces QR and MN. The rectangle LOTU having adjacent sides in the ratio sin 30 :sin 60 establishes the ratio of the sides of a rectangle required for a beam, reflecting at 30° and 60°, to describe coincident cyclic tracks within the rectangle. Track 6 (shown dotted) indicates the path followed, the path for coincident tracks in FIG. 1 being given by track 5 (shown dotted) conforming to square FGJK. If sides OT and LU are shortened by a decrement $\alpha$ (QT, RU) there is a displacement of 2$\alpha$ between successive reflections along the faces PQ and SR. For the cyclically-reflected beam to emerge from the prism normal to face SM it is essential for the beam 1 to be incident at face PN at a distance less than 1.732$\alpha$ (sin 60 2$\alpha$) from P. The number of cyclic tracks is determined by the length of the side RS and the value of $\alpha$; as before the smaller the value of $\alpha$ the greater the number of reflections, and for ATR measurements of microsize samples $\alpha$ should be small.

In the drawing, substantially to scale, the rectangle LOTU can have, for example, a value of 10 mms. for the short sides LU, OT; the values of LR, OQ being 9.4 mms., whence $\alpha$ has a value of 0.6 mms. For the aforementioned values the prisms of FIGS. 1 and 3 can have lateral faces having a dimension of, for example, 20 mms. perpendicular to the plane of the drawings.

Figure 4A:
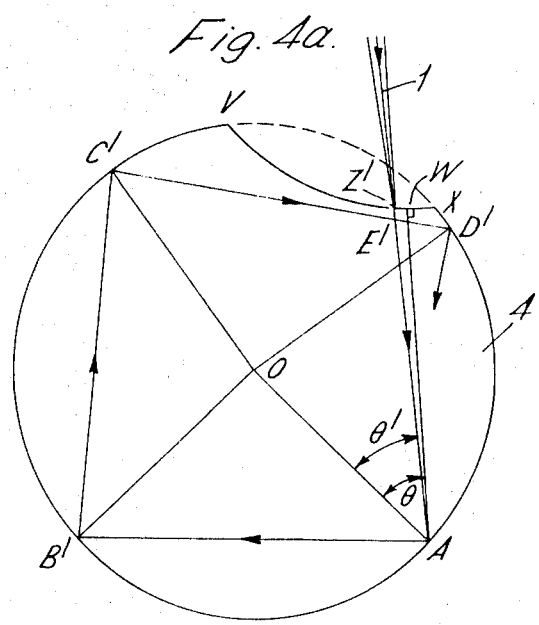
FIGS. 4a and 4b are optical illustrations showing a cyclic track produced by a beam incident at a cylinder having a concave face for totally internally reflecting angles of <45° and >45°.
Figure 4B:
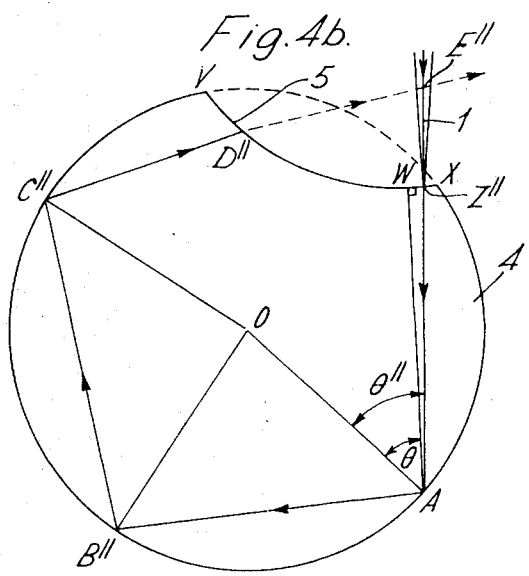

FIGS. 4a and 4b show a prism in the form of cylinder 4 with a concave face 5. A line WA forms an angle $\theta$ of 45° with a radius OA and cuts the arc VX, delineating face 5, at W and is normal to the tangent thereat.

In FIG. 4a a beam 1 incident at Z', in the direction Z'A, is internally reflected at A, the angle of incidence at A, $\theta'$, being <45° and having a value such that intersection E' is within the prism and the reflection C'D', given by the geometry of the cyclic track Z'AB'C'D', does not intersect the arc VX.

Figure 7:
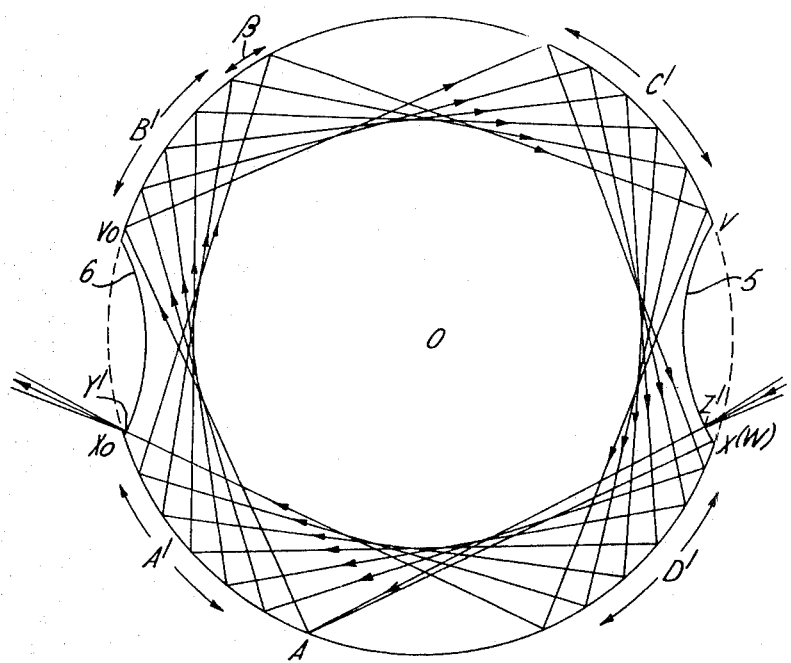
FIG. 7 is an optical diagram showing the cyclic tracks produced by reflection of a beam of infrared radiation incident at a cylinder having concave entry and exit faces for a totally internally reflecting angle of <45°.

The beam 1 is incident at A at an angle of incidence causing noncoincident multiple cyclic tracks to be generated (see FIGS. 5 and 7).

FIG. 4b demonstrates a cylinder/angle combination that fails to generate cyclic tracks. A beam 1 incident at Z'', in the direction Z''A, is internally reflected at A, the angle of incidence $\theta''$ being > 45°. The geometry of the cyclic track produced by reflection at B'' and C'' is such that intersection E'' is without the cylinder i.e. C''D'' (extended) intersects the incident beam 1 without the cylinder. The beam 1 emerges from the cylinder through the face 5, C''D'' intersecting arc VX at an angle less than the critical angle, or, alternatively, for angles exceeding the critical angle the regularity of the reflectance pattern is destroyed by internal reflection at face. 5.

Figure 6:
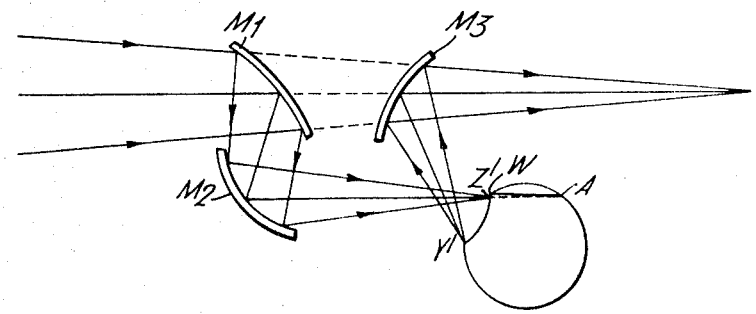
FIG. 6 is an optical schematic diagram of an ATR system including the cylinder shown at FIG. 5.
Figure 8:
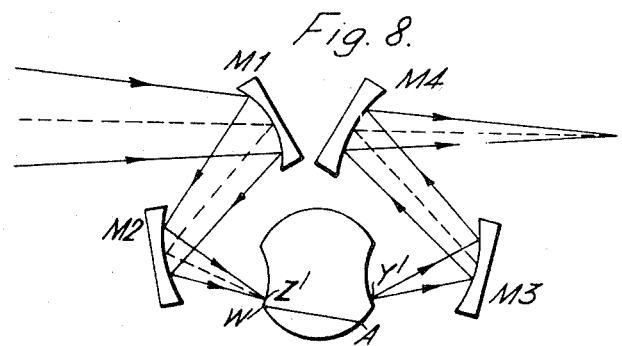
FIG. 8 is an optical schematic diagram of an ATR system including the cylinder shown at FIG. 7.

FIG. 5 shows a multiplicity of cyclic tracks for the $\theta'$ value of FIG. 4a: the reflectance points A', B', C' and D' advance clockwise the displacement $\beta$, between successive reflectance points being $\pi d 8\Phi/360$ where $d =$ the diameter of the cylinder and $\Phi = 45 - \theta$, the angular distance advanced per cycle i.e. the angle subtended by $\beta$ at the center 0, being $4 \times 2\Phi$. The advancing reflectance points C' show that VX, delineating the face 5, requires to be an arc and cannot be a chord. A face substantially normal to the cycling and circumferentially advancing beam is required for presentation to the beam so that the beam can emerge from the cylinder with minimal refraction. Such a face is provided by arc VX: it is shown that after four cycles and during the fifth cycle the beam, in direction B'C', is intercepted by the arc VX at Y' and as the beam is substantially normal to the tangent at Y' the beam emerges from the cylinder substantially without refraction. By selecting cylinders having faces corresponding to arcs XV'' or XV' the beam can be intercepted after completing more or less cycles. In the drawing, substantially to scale, for FIG. 5 and of FIG. 7 (see hereafter), the cylinder can have, for example, a diameter of 10 mms. and a dimension of 20 mms. in the direction of the cylindrical axis. FIG. 6 shows a mirror system comprising mirrors $M_1$ and $M_2$ for focusing a beam of infrared radiation at Z' and a mirror $M_3$ for focusing the emergent beam at the slit of a spectrophotometer. FIG. 7 shows a multiplicity of cyclic tracks for the $\theta$ value of FIG. 4a but the cylinder has two diametrically opposite concave faces 5 and 6 in lieu of the single face for the cylinder shown at FIG. 5. The beam 1 is incident at Z' on face 5 and emerges at Y' on face 6. FIG. 8 shows a mirror system comprising mirrors $M_1$ and $M_2$ for focusing a beam of the infrared radiation at Z' on face 5 and mirrors $M_3$ and $M_4$ for focusing the emergent beam leaving face 6 at Y' at a spectrophotometer slit.

Figure 9:
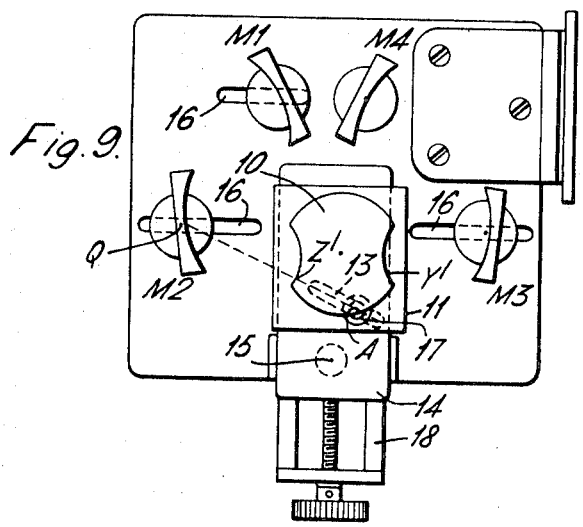
FIG. 9 is a plan view of an ATR system including the cylinder shown at FIG. 7.
Figure 10:
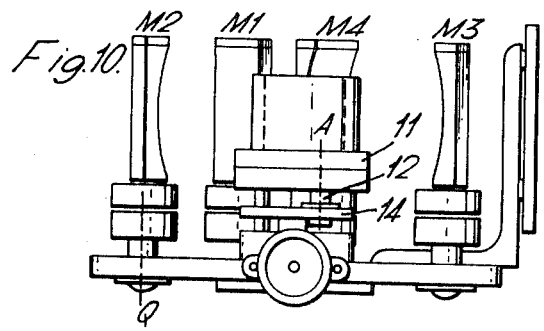
FIG. 10 is an elevation view of the ATR system shown in plan view at FIG. 9.

FIGS. 9 and 10 show a reflecting cylinder 10 mounted on a table 11 rotatable about the axis 17 of a supporting shaft 12. The shaft 12 is slidable in a slot 13 formed in a platform 14: the platform 14 can be rotated about an axis 15 and moved laterally on slides 18. Mirrors $M_1$, $M_2$, $M_3$ and $M_4$ can be rotated, for focusing and mirrors $M_1$, $M_2$ and $M_3$ can be displaced along the slots 16 for the same purpose. To align the optical system the cylinder 10 is removed from the table 11 and a beam from an infrared source is focused at a point near the axis 17. The angles of mirrors $M_1$ and $M_2$, the position of $M_2$ in its slot 16, and the position of the table 11 and platform 14 are adjusted so that the beam focuses near axis 17; the slot 13 being aligned with the axis of the beam from $M_2$ (i.e. QA, A being coincident with axis 17). The table and platform can be marked for alignment purposes and the cylinder 10 can be marked with the line WA (see FIG. 7, W being coincident with X). The cylinder 10 is remounted with the point A coincident with axis 17 and the line WA coincident with the axis QA. The table 11 is moved along the slot 13 until the beam is focused alongside W on the cylinder entry face. The table 11 can be rotated fractionally until a reflectance point D' is observed near X (or W), indicating that the beam is not intercepting the arc VX. An emergent beam will then leave the exit face at Y' for a beam incident at the entry face at Z', the angle $\theta$ (Z'AO, FIG. 7) being <45°. Mirror $M_3$ is adjusted to intercept the emergent beam and to reflect it onto mirror $M_4$, mirror $M_4$ focusing the beam at the slit of a spectrophotometer.

Figure 11:
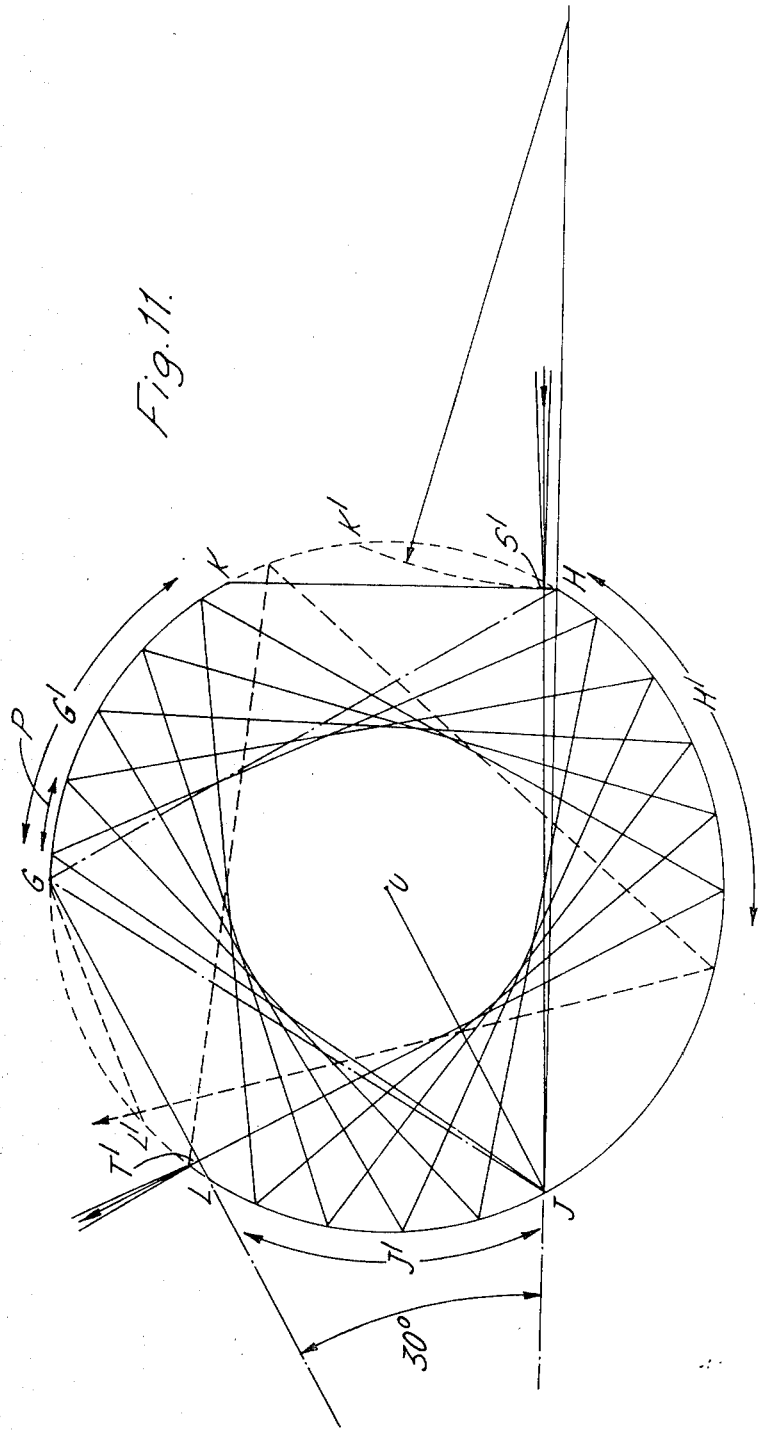
FIG. 11 is an optical diagram showing the cyclic tracks produced by reflection of a beam of infrared radiation incident at a cylinder having flat entry and exit faces for a totally internally reflecting angle of <30°.

FIG. 11 shows an optical construction for multiple cycling for angles of incidence <30°, and FIG. 12 is a simplified drawing illustrating a cylinder construction suitable for such angles of incidence. GHJ is an equilateral triangle with a chord HK constructed perpendicular to HJ:OP is parallel to GJ and HK is extended to intersect OP at M; M is joined to G and MG is extended to intersect HJ extended at N. The chord HK delineates the entry face and the chord GL delineates the exit face. A beam of infrared radiation incident at S' is totally reflected at J (the angle S'JO, $\lambda'$, being <30°), at the arc GK and at the arc HJ. The successively reflected beam describes noncoincident cyclic tracks, the reflectance points J', G' and H' advancing clockwise, the displacement $\rho$ between successive reflectance points being $\pi d 6\alpha/360$ where $d =$ the diameter of the cylinder $\gamma = 45 - \lambda'$, the angular distance advanced per cycle and subtended by $\rho$ being $3 \times 2 \gamma$. The advancing reflectance points for a <30° system show that GL and HK can be chords, as the chords do not intercept the cycling beam for an emergent beam substantially normal to the exit face. If desired the reflectance area can be increased by substituting an arc HK' in lieu of chord HK for the entry face and displacing the exit face to GL', but the increase in reflectance area will generally not justify cutting an arc HK'. As before, for the prisms of FIG. 5 and 7, the cylinder of the substantially scale drawing can have, for example, a diameter of 10 mms. and a dimension of 20 mms. in the direction of the cylindrical axis.

FIG. 13 shows the cyclic tracks produced by a 1 incident at a hexagonal prism LMNPQR derived from a modified cube LJKR, the modified cube resulting from having face RK inclined at a small angle $\delta$, the angle LRK being 90° +$\delta$ and the angle JKR 90° −$\delta$. The generation of cyclic tracks is induced by the inclined face which results in the reflected beam being totally reflected at Y' instead of emerging at Y. In the drawing, substantially to scale, the cube can have, for example, a side dimension of 10 mms. and a value for $\delta$ of 2°. The polygonal prism of FIG. 1 is preferred, as the displacement between successive reflectance points along one face is constant whereas with an inclined face the displacement is steadily increasing.

With reference to FIGS. 7, 8, 9 and 10, sample for absorptiometric analysis is applied to the lateral faces designated by the arc VV. and XXo (see FIG. 7) i.e. the reflecting faces. The sample is applied to the whole or a part of one or both reflecting faces. If applied to a part the part must be an area swept by one or more advancing reflectance points A', B', C' and D'. The same consideration is relevant to the prism of FIGS. 5 and 6 and to the prism shown at FIGS. 11 and 12. Similarly the prisms of FIGS. 1, 2 and 3 have sample applied to the whole or a part of one or more of the lateral reflecting faces: where only a part of a face is covered with sample that part must be swept by reflectance points.

In the thin film absorptiometric analysis of most organic compounds, for example, it is convenient to dissolve the compound in an inert solvent e.g. methanol, which readily vaporizes, and to apply a film of the solution to the prism, the methanol vaporizing to leave a thin film of solid adhering to the prism.

The effective path length in infrared ATR measurements is the product of the depth of penetration and the number of reflections. The depth of penetration varies directly with the wavelength of the incident radiation and inversely with the angle of incidence: as the angle of incident radiation increases beyond the critical angle the penetration decreases i.e. the intensity of the absorption bands decreases as the interval from the critical angle increases. The depth of penetration is also a function of (i) the refractive index of the prism ($\mu$ prism)—as the prism index is increased the depth of penetration decreases, (ii) the refractive index of the sample ($\mu$ sample)—as the sample index increases the depth of penetration also increases, (iii) the absorption coefficient of the sample and (iv) the thickness of the sample. For practical purposes the three principal factors are the wavelength, the angle of incidence and the relative refractive index ($\mu$ sample/$\mu$ prism); the correlation of relative refractive index and angle of incidence being discussed below, with particular reference to the ATR measurement of thick films.

The critical angle ($\Phi$) is related to the refractive indices ($\mu$ sample, $\mu$ prism) by the expression sin $\mu = \mu$ sample/$\mu$ prism (Snell's Law, for law, for critical reflection). A fixed critical angle for a certain prism material thus imposes a limit on the sample index (for thick film measurements), samples having indices in excess of the limit causing the infrared beam to be refracted and not totally reflected. Moreover spectral distortion occurs when the angle of incidence approaches the critical angle and there must be due allowance for this in the allowable sample index. In addition the refractive index of an absorbing sample changes rapidly in the region of an absorption band; accordingly in practice a maximum sample index 0.2 below the critical index value is selected.

The following Table shows the maximum and critical sample index values for thick film measurements for crystals of KRS-5 (thallous bromide-iodide), germanium and silver chloride at each of 3 angles.

|  | 30° | 45° | 60° |
|---|---|---|---|
| KRS-5: |  |  |  |
| Critical index | 1.25 | 1.7 | 2.0 |
| Maximum index | 1.05 | 1.5 | 1.8 |
| Germanium: |  |  |  |
| Critical index | 2.0 | 2.8 | 3.5 |
| Maximum index | 1.8 | 2.6 | 3.3 |
| Silver chloride: |  |  |  |
| Critical index | 1.0 | 1.4 | 1.7 |
| Maximum index | 0.8 | 1.2 | 1.5 |

In the examination of organic compounds, having indices 1.5, KRS-5 with incident beams of 45° is most suitable, a 60° angle being needed for higher index samples or for lower penetration while 30° is a little value; germanium with incident beams of 30° and 45° is useful, 60° beams conferring minimum penetration for organic samples with an average refractive index; and for silver chloride the only useful angle is 60° for which the depth of penetration is comparable with KRS-5 at 45°. Germanium, in particular, is a prism material well-suited to multiple reflection techniques, spectra of low intensity resulting when it is used with single reflection prisms.

The relationship between the refractive indices of suitable prism materials and a range of refractive indices of organic compounds is presented in the following Table showing the angles for critical reflection (infrared radiation).

ANGLES FOR CRITICAL REFLECTION

| Prism Material | Refractive index | Critical angles, refractive index of sample | | | |
|---|---|---|---|---|---|
|  |  | 1.3 | 1.4 | 1.5 | 1.6 |
| $CaF_2$ | 1.43 | 66 |  |  |  |
| NaCl | 1.52 | 60 | 67 |  |  |
| AgCl | 2.0 | 40 | 45 | 49 | 53 |
| KRS-6 (thallous chloride-iodide) | 2.19 | 36 | 40 | 43 | 47 |
| KRS-5 (thallous bromide-iodide) | 2.38 | 33 | 36 | 39 | 42 |
| Ge | 4.02 | 19 | 20 | 22 | 24 |

The following Table shows that angles greater than the critical angle are required to produce spectra free from the distorting effects of refraction, only fair or poor spectra being obtained as the incident angle approaches the critical angle in thick film measurements. Good spectra are those showing no departure from transmission spectra, fair spectra are those showing distortion at longer wavelengths only and poor spectra are those showing distortion generally.

QUALITY OF ATR SPECTRA WITH VARIOUS PRISMS

| Refractive index sample | Incident angles | | | | | | |
|---|---|---|---|---|---|---|---|
|  | Good spectra | | | Fair spectra | | Poor spectra | |
|  | KRS-5 | KRS-6 | AgCl | KRS-6 | AgCl | KRS-6 | AgCl |
| 1.3-1.4 | 40-65 | 50-65 | 60-65 | 45 | 50-55 | 40 | 40-45 |
| 1.5 | 40-65 | 50-65 | 60-65 | 45 | 50-55 | 40 | 40-45 |
| 1.6 | 40-65 | 50-65 | 65 | 45 | 60 | 40 | 40-45 |

As the refractive index of the prism material approaches that of the sample the spectra become more intense i.e. the absorbance of the bands in the spectrum becomes greater. In practice the most intense spectra that can be obtained for a range of sample refractive indices are those achieved with AgCl prisms, although AgCl has a more limited incident angle range than either KRS-5 or KRS-6 and outside the limited range shows more severe distortion.

FIG. 14 shows a single reflection at a microfilm 20 adhering to a reflective face of a prism 21. When the thickness of the sample film is less than the depth of penetration of the beam, as here shown, the critical angle is determined not by $p$ $s = \mu s / \mu_p$, $\mu_s$ being the refractive index of the sample and $\mu_p$ the refractive index of the prism, but by $p^\mu a$, the refractive index of the prism with respect to air ($a$). Hence for total internal reflection to occur with microfilms the refractive index of the sample need not be lower than that of the prism, so that the range of solids that can be examined with a single prism is extended. Moreover spectra do not become distorted when measurements are made near to the critical angle and absorption is not relatively stronger at longer wavelengths, two of the major drawbacks associated with ATR measurements of thick films. Thus, the internal reflection spectra of thin films closely resembles transmission spectra over a wide range of angles of incidence.

Thus in ATR measurements the optimum depth of penetration in thick film measurements is determined by correlating the angle of incidence with the relative refractive index, as discussed above; the effective path length being the product of the optimum penetration and the number of reflections.

In the measurement of thin films the effective path length is the product of twice the film thickness—the penetration at each reflection—and the number of reflections. The number of reflections hitherto achieved with known multiple reflection prisms, both in thick and thin film measurements, can be multiplied and the density of the reflections substantially increased by the use of prisms according to the apparatus of the present invention, wherein optical reflectance is used to cause a beam to describe cyclic tracks within a prism the prism shape being such that noncoincident reflections occur.

I claim:

1. Optical apparatus for use with an infrared spectrophotometer for attenuated total reflectance measurements comprising a solid prism, suitable for internally reflecting a focused beam of infrared radiation incident substantially normal to and brought to a focus at a lateral face thereof, the lateral faces of said prism being relatively disposed such that the beam is reflected by successive total internal reflections and describes a plurality of noncoincident cyclic tracks within the prism before being incident at a lateral face at an angle of incidence less than the critical angle and emerging from the prism, wherein the individual light rays of the beam follow a path in substantially a single plane as they describe the plurality of noncoincident cyclic tracks within the prism, means for focusing a beam of infrared radiation substantially normal to the first-mentioned lateral face and for locating said beam at a position on said face to generate said cyclic tracks and means for focusing the emergent beam at an entrance slit of said spectrophotometer.

2. Optical apparatus as claimed in claim 1 wherein the prism has the shape of a cylinder with a segment removed therefrom to form a lateral concave face, the beam being focusable and locatable on said first concave face so as to emerge therefrom after multiple-reflection.

3. Optical apparatus as claimed in claim 1 wherein the prism is a hexagonal prism the lateral faces of the prism being relatively disposed such that the internally reflecting angles formed are 45°.

4. Optical apparatus as claimed in claim 3 wherein the hexagonal prism has one pair of parallel faces coplanar with one pair of sides of a notional square and another pair of parallel faces spaced closer together than are the other pair of sides of the notional square, and two further faces each disposed at substantially 45° to a common face of said one pair of faces and at substantially 45° to each of said other pair of faces, said focusing means being arranged respectively to focus a beam onto, and emerging from, each of said two further faces.

5. Optical apparatus as claimed in claim 1 wherein the prism is a hexagonal prism the lateral faces of the prism being relatively disposed such that the internally reflecting angles formed are 30° and 60°.

6. Optical apparatus as claimed in claim 5 wherein the hexagonal prism has one pair of parallel faces coplanar with the shorter pair of sides of a notional rectangle whose adjacent sides have lengths substantially in the ratio sin 30: sin 60 and another pair of parallel faces spaced closer together than are the longer pair of sides of the notional rectangle, and two further faces each disposed at substantially 60° to a common face of said other pair of faces and at substantially 30° to each of said one pair of faces, said focusing means being arranged respectively to focus a beam onto, and emerging from, each of said two further faces.

7. Optical apparatus as claimed in claim 1 wherein the prism has the shape of a cylinder having a first and second segment removed therefrom to form first and second lateral plane faces, the beam being focusable to be incident on the first face and to emerge through the second face, the first and second faces being relatively disposed to form internally reflecting angles of <30°.

8. Optical apparatus as claimed in claim 7 wherein the first lateral face is concave.

9. Optical apparatus as claimed in claim 1 wherein the prism has the shape of a cylinder with first and second segments removed therefrom to form first and second lateral concave faces, the faces being substantially diametrically opposite, the beam being focusable and locatable on said first face so as to emerge through the second face.